(12) United States Patent
Morin et al.

(10) Patent No.: US 6,497,954 B1
(45) Date of Patent: Dec. 24, 2002

(54) TEXTILE/RUBBER COMPOSITES

(75) Inventors: Brian G. Morin, Greer, SC (US); Dany Felix Maria Michiels, Haaltert (BE); Brenda D. Wentz, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/561,267

(22) Filed: Apr. 28, 2000

Related U.S. Application Data

(63) Continuation of application No. 09/267,468, filed on Mar. 11, 1999, now Pat. No. 6,096,156.
(51) Int. Cl.$^7$ .............................. D02G 3/00; B60B 4/08
(52) U.S. Cl. ........................ 428/375; 152/910; 152/451; 152/565; 156/110.1; 156/272.2
(58) Field of Search ............................ 427/40; 156/911; 428/375, 293, 543

(56) References Cited

U.S. PATENT DOCUMENTS 3,695,326 A * 10/1972 Bryant et al. ............... 152/358
5,284,543 A * 2/1994 Kusano et al. ........... 156/272.6
6,046,262 A * 4/2000 Li et al. ..................... 524/261

* cited by examiner

Primary Examiner—Terrel Morris
Assistant Examiner—Alexis Wachtel
(74) Attorney, Agent, or Firm—Terry T. Moyer; William S. Parks

(57) ABSTRACT

This invention relates to a method of promoting the adhesion of textiles to rubber compounds through a vinyl compound plasma pre-treatment procedure and a subsequent application of resorcinol-formaldehyde latex (RFL) to the textile surface. The inventive method encompasses a process through which free radicals of compounds comprising strong carbon-carbon bonds form a film over textile films and then covalently bonded to the resin component of the RFL. Such a method thus produces an extremely strong and versatile adhesive that facilitates adhesion between rubber compounds and heretofore unusable or difficult-to-use textiles. The resultant textile/rubber composites are utilized as reinforcements within such materials as automobile tires, fan belts, conveyor belts, and the like. Such materials and composites are also contemplated within this invention.

12 Claims, No Drawings

TEXTILE/RUBBER COMPOSITES

CROSS REFERENCE TO RELATED APPLICATIONS

This application is a continuation of application Ser. No. 09/267,468, filed on Mar. 11, 1999 now U.S. Pat. No. 6,096,156. This parent application is herein entirely incorporated by reference.

FIELD OF THE INVENTION

This invention relates to a method of promoting the adhesion of textiles to rubber compounds through a vinyl compound plasma pretreatment procedure and a subsequent application of resorcinol-for aldehyde latex (RFL) to the textile surface. The inventive method encompasses a process through which free radicals of compounds comprising strong carbon-carbon bonds form a film over a textile substrate and then covalently bond the textile to the resin component of the RFL. Such a method thus produces an extremely strong and versatile adhesive that facilitates adhesion between rubber compounds and heretofore unusable or difficult-to-use textiles. The resultant textile/rubber composites are utilized as reinforcements within such materials as automobile tires, fan belts, conveyor belts, and the like. Such materials and composites are also contemplated within this invention.

DISCUSSION OF THE PRIOR ART

It has long been known that adhering a textile, particularly one composed of filaments having high tenacity to a rubber enhances the modulus and tensile strength of the rubber component and provides long-lasting durability, particularly in high friction applications. Examples of such applications include fan and timing belts within automobile engines; vehicle tires; conveyor belts; and the like. The main requirement of such textile-reinforced rubber articles has been the strength of adhesion between the textile and the rubber. Without any primer treatment, the textile will not effectively adhere to the rubber. A weak bond between the two components results in separation of the two layers and mechanical failure of the resulting composite. Thus, it has been and is necessary to provide a textile treatment to enhance the adhesion of these two distinct components.

The primary method followed within the prior art of providing such adherence between rubber and textile layers includes coating or impregnating the textile layer with a formaldehyde latex, such as a resorcinol formaldehyde vinyl-pyridine rubber latex or RFL. This creates a resin layer which encapsulates the textile fibers and also has encapsulated within it rubber particles which can be adhered to the rubber compound through a curing process. Unfortunately, this process does not provide substantial adhesion between the resin encapsulating layer and the textile fibers. Various methods of promoting adhesion between the resin and the textile have been disclosed including pre-coating the textile with an RFL latex and an amino functional polyacrylate, as in U.S. Pat. No. 5,654,099, to Pelton, and in European Patent Application 665,390, to Tsubakimoto Chain Company, or utilizing a pre-activated textile which has reactive pendant groups to facilitate adhesion between the fabric surface and the reactive sites on the rubber layer, all of the aforementioned references being herein entirely incorporated by reference. The RFL coating method results in a composition which does not always provide sufficient adhesion between layers. Pre-activated textiles, such as a polyester fibers coated with an epoxy adhesion enhancer, are typically used in combination with an RFL treatment to further improve the textile adhesion to rubbers. Although such pre-activated textiles perform well in many cases, there remains a need for less expensive methods and compositions for adhesion promotion between rubber and textile layers in order ultimately to produce a reinforced, long-lasting, and durable rubber product. Also worth mentioning are U.S. Pat. No. 5,064,876, to Hamada et al., and U.S. Pat. No. 5,082,738, to Swofford, both of which teach a primer composition for promoting adhesion for polymer films.

Different, stronger textile/rubber composites have been formed through the utilization of plasma pre-treatment methods. Of particular interest are U.S. Pat. No. 5,501,880 to Parker et al., U.S. Pat. No. 5,283,119 to Shuttleworth et al., and U.S. Pat. No. 5,053,246 to Shuttleworth et al. Each of these references discloses a plasma pretreatment of textiles in order to effectuate improved adhesion between the textile and a RFL rubber. Within these methods, the textile surface is cleaned with specific plasma gases ($O_2/CF_4$) initially and then treated again with other plasma gases to provide a surface which facilitates adhesion between the textile and the RFL. Plasma cleaning and activation provide a pristine surface with a more favorable surface energy for coating with an RFL latex. This increases the adhesion to the rubber by providing more thorough (and thus better) contact between the textile and the resin component of the RFL. However, there is still no substantial covalent bonding between the textile and the RFL. U.S. Pat. Nos. 5,053,246 and 5,283,119, both to Shuttleworth et al., teach a subsequent step in which a $CS_2$ plasma is utilized to plasma deposit a sulfur-containing film on the textile surface. This increases the adhesion further by allowing this film to cross-link with the rubber latex particles in the RFL. Unfortunately, the adhesion increase is relatively modest because the latex particles are substantially covered with the resin component of the RFL, blocking the creation of the desired covalent bonds. The chief benefit of these two patents is the availability of bonding rubber to a textile without utilizing an extra RFL component. However, the adhesion obtained is, again, unsatisfactory. Furthermore, sulfur-containing compounds present undesirable environmental hazards.

Thus, resin encapsulation of textile fibers appears to produce the limiting degree of adhesiveness for the resultant textile/rubber composite because the resin component will more easily become disengaged from around such textile fibers than if an actual resin film adhered substantially uniformly over the textile surface. This same type of problem has been noticed in other previous teachings, as in U.S. Pat. No. 5,466,424 to Kusano et al., U.S. Pat. No. 5,316,739 to Yoshikawa et al., U.S. Pat. No. 5,160,592 to Spitsin et al., U.S. Pat. No. 5,108,780 to Pitt et al., and U.S. Pat. No. 4,756,925 to Furukawa et al.

This encapsulation characteristic has subsequently limited the types of textiles which may be employed within such prior methods. For instance, nylon (polyamide) is the primary (if not only) fabric available as a potential reinforcement material within the above-mentioned patent documents. This fabric permits strong adhesion between the resin of the RFL even through this encapsulation procedure and thus is readily utilized throughout the textile/rubber reinforcement composite industry. However, such a fabric suffers from a number of limitations itself. For example, as compared with polyester, nylon is much more expensive to use. Polyester, however, is very difficult to adhere with RFL rubber and thus has not proven to be easy to combine with rubber to form a proper reinforcement material in the past.

Also, polyaramid textiles, such as Kevlar® (from DuPont du Nemours), Twaron™ (from Akzo), and Technora™ (from Teijin), as merely non-limiting examples, are well known as providing very strong reinforcements and are particularly desirable as textiles within such textile/rubber composites. However, these fabrics suffer from the same adhesion difficulty problem as with polyester and thus have had limited utility in the past within the pertinent industries (i.e., tire reinforcement, conveyor belts, and the like). As such, there still exists a need to facilitate adhesion between RFL rubber and polyesters or polyaramids in order to provide cost-effective and/or extremely strong textile/rubber reinforcement composites within the target industries (i.e., automobile tires, fan belts, conveyor belts, and the like).

DESCRIPTION OF THE INVENTION

It is thus an object of the invention to provide improved adhesion for a long-lasting and durable textile-reinforced rubber product comprised of any type of textile. A further object is to provide a plasma pretreatment method which itself provides versatility of selection of textiles. Another object of the invention is to provide a method of promoting adhesion which ultimately provides a textile-reinforced rubber product comprised of any type of textile which does not exhibit adhesive failure. Yet another object of this invention is to provide a method of plasma pre-treatment which ultimately produces vastly improved adhesive quailties within textile/rubber composites without incurring an appreciable amount of extra manufacturing costs.

Accordingly, this invention encompasses a method for promoting the adhesion between a textile and a rubber comprising the treatment of a textile in a vinyl compound plasma followed by coating the resultant textile with a resorcinol-formaldehyde latex and subsequently contacting said textile with a rubber compound. With greater particularity, this inventive method comprises the following steps (a) providing a textile, at least a portion of which is comprised of fibers selected from the group consisting of polyaramids, polyesters, nylon and any mixtures thereof;

(b) plasma cleaning the textile surface, thereby attaching amino or carbonyl groups to the textile surface;

(c) treating the resultant textile of step "b" in a medium selected from the group consisting of a vinyl compound plasma and a plasma gas containing a vinyl compound, thereby attaching various carbon-bonded compounds having exposed free radicals to the textile;

(d) optionally coating the resultant textile of step "c" with a resin;

(e) coating the resultant textile of either of steps "c" or "d" with a resorcinol-formaldehyde latex (RFL);

(f) optionally coating the resultant latex-coated textile of step "e" with at least one adhesive compound selected from the group consisting of a cement, a tackifier, an overcoat, a resin, and mixtures thereof;

(g) providing a rubber compound; and (h) contacting the RFL-coated textile of either of steps "e" or "f" with the rubber compound of step "g".

Nowhere within the prior art has such a specific vinyl compound plasma treatment step been utilized to form a textile/rubber composite. Furthermore, nor has such a specific composition or method of utilizing such a specific plasma treatment been taught or fairly suggested. Such methods provide significant advantages over the standard adhesion methods of the state of the art.

The inventive method does not add an appreciable amount to the relative cost of preparing the target textile/rubber composite. In fact, the major costs involved in this inventive process are incurred from the rubber and/or textile components. The ability of this inventive method to provide polyaramid/rubber composites at relatively low cost as well as the ability of this method to produce polyester/rubber composites, again at very low cost, is thus highly unexpected and greatly desired within the suitable industries.

Such a method generally permits the application of very strong carbon-bonded groups to the textile surface through the treatment of the textile with a vinyl compound plasma. Without intending to be limited to any scientific theory, it is believed that the plasma generated with vinyl compounds produces a vast array of compounds having myriad different chain lengths and structures which easily bond to the surface of the substrate textile. As the plasma-generating process cleaves the vinyl compounds in random fashion, the resultant textile surface treatment appears to be highly tackified, most likely due to the formation of carbon-containing compounds having large amounts of freely exposed free radicals. This tacky composition thus appears to form an actual film layer on the textile surface. Apparently, the exposed free radicals produced on the textile surface through the vinyl compound plasma or plasma gas treatment bond to the RFL resin component themselves, thereby providing increasing bonding and adhesion between the textile substrate and the RFL. Since the degree of free radical generation is extremely high, the tacky vinyl compound plasma-generated composition thus adheres to a very large surface area of RFL. Combined with the very strong carbon bonds attached to the textile surface, the complete degree of adhesiveness between the textile and the RFL is very high. In addition, since the plasma polymerized vinyl film and the rubber latex of the RFL are very similar chemically, there will be increased mixing/solubility between the RFL and the textile, thereby providing increased adhesive properties. The RFL is then left exposed to produce very strong bonds with the rubber compound contacted with the resultant RFL-textile to form a very strong textile/rubber composite which exhibits rubber from rubber tearing before the textile and rubber exhibit any disengagement due to the very strong bond formed between the two components.

This inventive process also encompasses a plasma pre-treatment prior to vinyl compound plasma treatment in order to "clean" the textile surface and theoretically apply other potentially strong bonding materials to the substrate. For example, an oxygen/tetrafluoromethane ($O_2/CF_4$) or an ammonia ($NH_3$) pre-treatment provides both a mechanism to remove unwanted debris and impurities from the textile surface, but also produces carboxy or amino linkages, respectively, on the target substrate. These linkages react with the vinyl compounds generated from such plasma, again, to form very strong bonds which enhance the adhesive qualities of the overall textile/rubber composite structure. Such a pre-treatment is highly preferred but is not required to effectuate a desired degree of adhesiveness between the vast array of plasma-generated vinyl compounds and the resin component of the RFL.

The plasma treatment and pre-treatment require a certain degree of power and pressure in order to be effective within this inventive method. Also, fiber speed and thus exposure time for the target textile also appear to be of importance to the performance of the ultimate textile/rubber composite. For instance, generally acceptable conditions for the vinyl compound plasma treatment are from about 5 to about 1,000 millitorr (mT) pressure, from about 5 watts to about 2.5 kilowatts power, for an exposure time of from about 5 seconds to about 5 minutes. Preferred conditions and exposures times are from about 10 to about 500 mT, most preferred from about 50 to about 250 mT; from about 10 watts to about 1 kilowatt, most preferred from about 60 to about 250 watts; and from about 10 seconds to about 2 minutes, most preferred from about 30 seconds to about 1 minutes. Generally acceptable, and well known, conditions and exposures times for the plasma "cleaning" procedure are from about 10 to about 10,000 mT, preferred from about 50 to about 5,000 mT, and most preferred from about 100 to about 1,000 mT; 10 watts to about 10 kilowatts, preferred from about 100 watts to about 2.5 kilowatts, and most preferred from about 250 watts to about 1 kilowatt; and exposure times of from about 5 seconds to about 5 minutes, preferred from about 10 seconds to about 2 minutes, and most preferred from about 30 seconds to about 1 minute. In actuality, these conditions and exposure times may vary according to the type of plasma generator utilized. These conditions and exposure times were the optima for the PS1010 cord treater from Plasma Science (which is an air to air system). More specific conditions are listed below in the EXAMPLEs.

It has been found that the inventive methods can be utilized with any rubber compositions and with any type of smooth filament textile normally utilized as a rubber reinforcement material, not to mention any other type of smooth filament textile which has proven difficult to use in such applications in the past (i.e., polyaramids, polyesters). Examples of rubber compositions include, but are not limited to, natural rubber, polyurethane rubber, neoprene rubber, ascium, viton, hypalon, styrene-butadiene rubber (SBR), carboxylated SBR, acrylonitrile-butadiene rubber (NBR), butyl rubber, fluorinated rubber, chlorobutyl rubber, bromobutyl rubber, and ethylene-propylene-diene rubber (EPDM), and any mixtures thereof. Modified rubbers which are potentially useful, though more expensive, include hydrogenated SBR, hydrogenated NBR, and carboxylated NBR. Suitable textiles include, and are not limited to, those comprising polyester, polyester/cotton blends, polyamides, such as nylon-6 or -6,6, polyaramids (such as Kevlar®, available from DuPont), polypropylene, boron derivatives, glass fibers, polyvinyl alcohols fibers, polypropylene oxide fibers, and carbon fibers. Of particular interest are polyesters and polyaramids since adhesion between these fibers and rubber has proven to be very difficult in the past. The textile component may be dyed or colored various shades and hues in order to facilitate categorizing the different widths, lengths, etc., of products such as, without limitation, timing belts, V-belts, and the like, for tires and for utilization in automobiles. Finally, the inventive methods, when utilized and/or practiced as intended, result in a textile-reinforced rubber product which does not exhibit textile/rubber adhesive failure.

Preferably, the inventive methods utilize any plasma treatment involving vinyl compound plasma generation. As noted above, the vast array of differing carbon-bonded compounds produced within such a specific treatment are highly desired, particularly since free radicals (which bond extremely well with the RFL resin) are easily produced in great quantities as a film on the textile surface. Thus, acrylic acid, ethylene, butadiene, vinyl pyridine, and any other such vinyl-group containing compounds (as well as any mixtures of such vinyl-group containing compounds) are useful as compounds for the plasma-treatment in this inventive method. The specifically named ones above are those which are most highly preferred due to their relatively low cost and their very effective performance. The plasma pre-treatment may utilize any "cleaning" plasma compound, such as $O_2/CF_4$ and $NH_3$, as merely examples which removes debris, etc., from the substrate surface and preferably provides a potentially strong bonding linkage on the cleaned textile as well. Such plasma compounds are well known in the art.

Optionally, a pre-RFL treatment of the textile surface may be performed after the plasma treatment wherein various types of resins may be adhered to the newly created tacky textile surface in order to improve the adhesive characteristics of the overall target textile/rubber composite. Thus, resins such as epoxy resins, isocyanates (in toluene), piperazines, silanes, and the like (including mixtures of such resins), may be reacted with the plastma-treated textile surface thereby creating a film of resin bonded to the textile-surface free radicals generated from the plasma treatment. After such a film is produced, the desired RFL would then be brought into contact with the resultant resin-coated textile whereupon the resin component of the RFL would form a film on the previously produced resin film surface. Such a resin/resin bond thus provides the necessary bond strength to effectuate the desired adhesion to the overall composite structure.

Similarly, upon completion of the contacting between the plasma-treated textile and the RFL, such a resultant coated textile may also be coated with an adhesive compound which provides improved adhesion between the RFL and the rubber compound. Such compounds are selected from cements (such as, as merely an example, a solution of rubber in toluene), tackifiers (such as, again as merely examples, polysiloxanes), overcoats (such as, again as merely examples, compositions such as Chemlock™, available from Lord Corporation, and Chemosil™, available from Henkel Corporation), resins, such as those noted above for the pre-RFL treatment of the textile surface (i.e., epoxies, silanes, piperazines, isocyanates, and the like), and any mixtures thereof.

Any standard rubber additives, including ultraviolet absorbers, antioxidants, dyes, colorants, curing agents, perfumes, antistatic agents, fillers (such as carbon black), silanes, and the like may be added to the rubber. To the textile substrate may be added any other standard textile additives, such as dyes, colorants, pigments, ultra violet absorbers, antioxidants, and the like. To the inventive composition and/or RFL used in combination with the inventive composition may be added wetting agents, antioxidants, and filler dispersions (such as carbon black, carbon fibers, tackifiers, UV absorbers, silica, ZnO dispersions, and flame retardant compounds).

Furthermore, any well known RFL composition may be utilized within the inventive method. Such are extremely well known to the ordinarily skilled practitioner within the pertinent art and include combinations of resorcinol and formaldehyde in varying ratios and at varying temperatures and pH levels and solids. Furthermore, such resorcinol and formaldehyde compositions are combined with any number of rubber latex compounds and other additives, including, as merely examples, epoxies, urethanes, and the like. Such RFL compositions are very well known in the art and the utilization of such types of compositions (any number of which may be used in the inventive method) would be well appreciated by the ordinarily skilled artisan in the textile/rubber reinforcement composite art. One particularly preferred RFL comprises the epoxy adhesive composition of U.S. Pat. No. 5,565,507 to Marco et al.

Additionally, the curing step between the RFL-coated textile and the rubber compound is performed in any conventional manner, such as through heat-activated vulcanization in the presence of a curing agent (such as organic peroxide). Again, such a step should be well within the purview of the ordinarily skilled artisan in this field.

DETAILED DESCRIPTION OF THE PREFERRED EMBODIMENT

The Examples below are indicative of the particularly preferred embodiment within the scope of the present invention:

EXAMPLES 1–2

Comparative Examples 3—14

In each EXAMPLE below, Twaron™ yarn (polyaramid) of approximately 1,000 denier was twisted two-for-one into a cord of approximately 2,000 denier. The cord was then continuously run through a vacuum chamber with a plasma created therein. The gas, gas pressure, and power were controllable plasma conditions and were adjusted as noted below for each EXAMPLE. The speed of the yarn dictated the residence time of the cord within the plasma chamber and was also adjusted for each EXAMPLE as noted below. Upon exiting the plasma chamber, the yarn was wound up thereby providing a continuous plasma process. EXAMPLES 1–7 encompassed a two-step plasma treatment for the subject cord, the initial being an $O_2/CF_4$ plasma pretreatment cleaning procedure, followed by the subject cord being wound up and subsequently exposed to a second plasma treatment, the plasma gases and conditions being specified in the table below. In all of the EXAMPLEs the cord was wound into a bobbin from which individual pieces of yarn were cut by hand approximately 15 minutes after the respective final plasma treatment, dipped in a RFL mixture and dried in a forced air oven at about 350° F. for about 4 minutes. All of the EXAMPLEs were coated from the same batch of RFL at the same time after plasma treatment was completed. The RFL coated yarn samples were then sealed in polyethylene bags and stored under normal conditions (room temperature and pressure) for two months. After this time, the coated yarns were removed from the bags and placed between two same-size samples of styrene-butadiene rubber (SBR) and cured, at a temperature of about 350° F. and a pressure of about 5 tons/square foot, into a single structure having yarn protruding from the front and back of the resultant composite. The plasma treatment conditions of these textile/rubber composites are more fully described in TABLE 1 below, with EXAMPLEs 1 through 7 having been initially subjected to a plasma pretreatment cleaning procedure, as discussed above, under the following conditions:

| PLASMA $O_2/CF_4$ PRE-TREATMENT CLEANING CONDITIONS | | | |
|---|---|---|---|
| Pressure (mTorr) | Power (watts) | Yarn Speed (feet/min) | Exposure Time (min) |
| 200 | 500 | 50 | 2 |

TABLE 1

Plasma Treatment Conditions

| Example # | Treatment Gas | Pressure (mTorr) | Power (watts) | Yarn Speed (feet/min) | Exposure Time (min) |
|---|---|---|---|---|---|
| 1 | Acrylic Acid | 200 | 200 | 50 | 2 |
| 2 | Acrylic Acid | 200 | 100 | 50 | 2 |
| 3 (Comparative) | $NH_3$ | 200 | 400 | 100 | 1 |
| 4 (Comparative) | $NH_3$ | 400 | 400 | 100 | 1 |
| 5 (Comparative) | $NH_3$ | 200 | 400 | 50 | 2 |
| 6 (Comparative) | $CH_3OH$ | 200 | 400 | 100 | 1 |
| 7 (Comparative) | $CH_3OH$ | 200 | 400 | 50 | 2 |
| 8 (Comparative) | $NH_3$ | 200 | 400 | 50 | 2 |
| 9 (Comparative) | $NH_3$ | 200 | 400 | 25 | 4 |
| 10 (Comparative) | $NH_3$ | 400 | 400 | 50 | 2 |
| 11 (Comparative) | $O_2/CF_4$ | 200 | 500 | 50 | 2 |
| 12 (Comparative) | $O_2/CF_4$ | 400 | 500 | 50 | 2 |
| 13 (Comparative) | Air[1] | 760,000 | 0 | 50 | 2 |
| 14 (Comparative) | $O_2/CF_4$[2] | 200 | 0 | 50 | 2 |

[1]Comparative EXAMPLE 13 included the coating of the yarn with an RFL without any vacuum or plasma processing after running through the inactive plasma chamber.
[2]Comparative EXAMPLE 14 included vacuum treatment of the yarn through the plasma chamber without any power applied.

Each of these EXAMPLEs was then tested for the ¼" pull-out strength of the yarn embedded within the textile/rubber composite structure. The numbers reported in TABLE 2, below are actually an average of test measurements for three samples subjected to the same conditions. A ten percent (10%) increase of about 1 pound of force for these pull-out tests is considered significant.

TABLE 2

| Test Measurements for Adhesive Characteristics Between Textile and Rubber | |
|---|---|
| Example # | Pull-Out Force (Pounds) |
| 1 | 16.9 |
| 2 | 16.7 |
| 3 (Comparative) | 13.2 |
| 4 (Comparative) | 13.5 |
| 5 (Comparative) | 13.6 |
| 6 (Comparative) | 11.1 |
| 7 (Comparative) | 12.9 |
| 8 (Comparative) | 12.7 |
| 9 (Comparative) | 13.0 |
| 10 (Comparative) | 11.0 |

TABLE 2-continued

Test Measurements for Adhesive Characteristics Between Textile and Rubber

| Example # | Pull-Out Force (Pounds) |
|---|---|
| 11 (Comparative) | 12.6 |
| 12 (Comparative) | 13.2 |
| 13 (Comparative) | 11.1 |
| 14 (Comparative) | 10.5 |

It is evident from these tests that the preferred embodiment EXAMPLEs (1 and 2) exhibited far superior rubber to textile adhesion than the Comparatives EXAMPLEs. Thus, the utilization of vinyl-compound plasma treatments provided vast improvements in the desired adhesive effects of the textile/rubber composite structures. In fact, the plasma chamber itself felt tacky to the touch upon completion of plasma treatment with the acrylic acid (vinyl compound). The other treatments did not produce such a result within the chamber and the $O_2/CF_4$ gas was utilized to clean the plasma chamber after the vinyl compound plasma treatment.

EXAMPLES 15–25

Comparative Examples 26–29

Different vinyl compounds were also utilized within a plasma treatment step for the yarn which was subsequently coated with a RFL, and contacted and cured with a SBR sample (as followed within the procedure outlined above for the previous EXAMPLEs. Each of the EXAMPLEs listed below were subjected to the plasma pretreatment discussed above as well. The pull-out test measurement was made for each EXAMPLE, below, as performed for the previous EXAMPLES, too. EXAMPLEs 15 through 17 and 26–28 tested the pull-out force on plasma-treated polyaramid fibers (the Twaron™ yarn as discussed previously). EXAMPLEs 18–25 and 29 tested the pull-out force on plasma-treated polyester fibers. Such polyesters are available from Akzo and are 1,000 denier polyethylene terephthalate twisted 2-ply, then twisted 3-ply, fibers, exhibiting a total denier of about 6,000. These were treated in the same manner as of EXAMPLEs 15–17.

It has been discovered that the optimum levels of power and pressure required to effectuate proper adhesive characteristics to the textile substrate through the use of vinyl compound plasma or plasma gas is relatively low as compared with the "cleaning" plasma treatments. In fact, the necessary levels for the "cleaning" plasma treatments must be relatively high; if conditions used were at too low a pressure and at too low a power level, a reduced degree of "cleaning" of the textile surface would occur which would substantially and deleteriously affect the adhesive characteristics of the ultimate textile/rubber composite. Were the power level and/or pressure level too high for the inventive treatments, the vinyl compound would be susceptible to degradation or the vinyl polymerization would run too fast. In such an instance, the compound fragments generated from such plasma treatment would be too small to properly polymerize or would create small "dust" particles on the textile substrate and the walls of the plasma chamber which would inhibit adhesion as well. Thus, although the power and pressure levels are different in TABLE 3 above, such differences actually compare the optimum levels for the specific plasma treatments tested. Clearly, the resultant adhesive measurements for the inventive method are either vastly improved over the comparative examples or evince procedures which produce comparable results from the other standard plasma treatments.

There are, of course, many alternative embodiments and modifications of the present invention which are intended to be included within the spirit and scope of the following claims.

What we claim is:

1. A rubber/textile composite comprising
   a textile comprising fibers, wherein said textile possesses a coating on at least a portion of said fibers comprising at least one layer of a tacky vinyl compound plasma-generated composition;
   resorcinol-formaldehyde latex adhered to said at least one layer of a tacky vinyl compound plasma-generated composition; and
   a layer of rubber coated over said resorcinol-formaldehyde latex.

2. The rubber/textile composite of claim 1 wherein said textile fibers are selected from the group consisting of polyaramids, polyesters, polyamides, and any blends thereof.

TABLE 3

Plasma Treatment Conditions and Textile/Rubber Adhesive Test Measurements

| Ex.# | Plasma Gas | Pressure (mTorr) | Power (watts) | Speed (ft/min) | Exposure Time (minutes) | Pull-Out Force (pounds) |
|---|---|---|---|---|---|---|
| 15 | Acrylic Acid | 250 | 200 | 100 | 1 | 19.5 |
| 16 | Ethylene | 250 | 200 | 100 | 1 | 21.1 |
| 17 | Butadiene | 250 | 200 | 100 | 1 | 17.1 |
| 18 | Acrylic Acid | 250 | 200 | 50 | 2 | 15.8 |
| 19 | Ethylene | 250 | 200 | 50 | 2 | 15.0 |
| 20 | Butadiene | 250 | 200 | 50 | 2 | 13.8 |
| 21 | Vinyl Pyridine | 250 | 200 | 50 | 2 | 17.9 |
| 22 | Acrylic Acid | 250 | 200 | 100 | 1 | 18.3 |
| 23 | Ethylene | 250 | 200 | 100 | 1 | 14.6 |
| 24 | Butadiene | 250 | 200 | 100 | 1 | 18.5 |
| 25 | Vinyl Pyridine | 250 | 200 | 100 | 1 | 18.0 |
| 26 | $O_2/CF_4$ | 400 | 500 | 50 | 2 | 16.8 |
| 27 | $NH_3$ | 400 | 400 | 100 | 1 | 17.6 |
| 28 | *Air | 760,000 | 0 | 100 | 1 | 13.7 |
| 29 | *Air | 760,000 | 0 | 100 | 1 | 12.2 |

3. The rubber/textile composite of claim 1 wherein said tacky vinyl compound plasma-generated composition vinyl-based compounds comprises vinyl compounds selected from the group consisting of acrylic acid, ethylene, butadiene, vinyl pyridine, and any mixtures thereof.

4. The rubber/textile composite of claim 2 wherein said textile fibers selected from the group consisting of polyaramids, polyesters, and any blends thereof.

5. The rubber/textile composite of claim 1 wherein said rubber layer comprises at least one rubber compound selected from the group consisting of natural rubber, polyurethane rubber, neoprene, viton, ascium, hypalon, styrene-butadiene rubber (SBR), carboxylated SBR, acrylonitrile-butadiene rubber (NBR), hydrogenated NBR, butyl rubber, fluorinated rubber, and ethylene-propylene-diene rubber (EPDM), chlorobutyl rubber, bromobutyl rubber, and any mixtures thereof.

6. The rubber/textile composite of claim 2 wherein said rubber layer comprises at least one rubber compound selected from the group consisting of natural rubber, polyurethane rubber, neoprene, viton, ascium, hypalon, styrene-butadiene rubber (SBR), carboxylated SBR, acrylonitrile-butadiene rubber (NBR), hydrogenated NBR, butyl rubber, fluorinated rubber, and ethylene-propylene-diene rubber (EPDM), chlorobutyl rubber, bromobutyl rubber, and any mixtures thereof.

7. The rubber/textile composite of claim 3 wherein said rubber layer comprises at least one rubber compound selected from the group consisting of natural rubber, polyurethane rubber, neoprene, viton, ascium, hypalon, styrene-butadiene rubber (SBR), carboxylated SBR, acrylonitrile-butadiene rubber (NBR), hydrogenated NBR, butyl rubber, fluorinated rubber, and ethylene-propylene-diene rubber (EPDM), chlorobutyl rubber, bromobutyl rubber, and any mixtures thereof.

8. The rubber/textile composite of claim 4 wherein said rubber layer comprises at least one rubber compound selected from the group consisting of natural rubber, polyurethane rubber, neoprene, viton, ascium, hypalon, styrene-butadiene rubber (SBR), carboxylated SBR, acrylonitrile-butadiene rubber (NBR), hydrogenated NBR, butyl rubber, fluorinated rubber, and ethylene-propylene-diene rubber (EPDM), chlorobutyl rubber, bromobutyl rubber, and any mixtures thereof.

9. A rubber/yarn composite comprising yarns selected from the group consisting of polyaramids, polyesters, and any blends thereof, produced by a method comprising the sequential steps of
   (a) providing a yarn selected from the group consisting of polyaramids, polyesters, and any blends thereof;
   (b) treating said yarn in a medium selected from the group consisting of a vinyl compound plasma and a plasma gas containing a vinyl compound;
   (c) coating said treated yarn with a resorcinol-formaldehyde latex; and
   (d) contacting said coated yarn with a rubber compound.

10. The rubber/yarn composite of claim 9 wherein said medium in step "b" is a vinyl compound plasma, wherein said vinyl compound is selected from the group consisting of acrylic acid, ethylene, butadiene, vinyl pyridine, and any mixtures thereof.

11. A rubber/textile composite comprising a textile comprising fibers selected from the group consisting of polyaramids, polyesters, and any blends thereof produced by a method comprising the sequential steps of
   (a) providing a textile comprising fibers selected from the group consisting of polyaramids, polyesters, and any blends thereof;
   (b) treating said textile in a medium selected from the group consisting of a vinyl compound plasma and a plasma gas containing a vinyl compound;
   (c) coating said treated textile with a resorcinol-formaldehyde latex; and
   (d) contacting said coated textile with a rubber compound.

12. The rubber/textile composite of claim 11 wherein said medium in step "b" is a vinyl compound plasma, wherein said vinyl compound is selected from the group consisting of acrylic acid, ethylene, butadiene, vinyl pyridine, and any mixtures thereof.

* * * * *